United States Patent
Burke et al.

(10) Patent No.: US 8,250,629 B2
(45) Date of Patent: Aug. 21, 2012

(54) SYSTEMS AND METHODS FOR FLEXIBLE SERVICE DELIVERY NETWORK SERVICES

(75) Inventors: Sarah Burke, Ottawa (CA); Yong Li, Ottawa (CA); Richard Brunet, Ottawa (CA); Giulio Graziani, Ottawa (CA)

(73) Assignee: Bridgewater Systems Corp., Ottawa (CA)

( * ) Notice: Subject to any disclaimer, the term of this patent is extended or adjusted under 35 U.S.C. 154(b) by 997 days.

(21) Appl. No.: 12/146,923

(22) Filed: Jun. 26, 2008

(65) Prior Publication Data

US 2009/0249452 A1    Oct. 1, 2009

Related U.S. Application Data

(60) Provisional application No. 61/041,294, filed on Apr. 1, 2008.

(51) Int. Cl.
*H04L 29/06* (2006.01)
(52) U.S. Cl. ............... 726/3; 370/235
(58) Field of Classification Search .......... None
See application file for complete search history.

(56) References Cited

U.S. PATENT DOCUMENTS

| | | | |
|---|---|---|---|
| 6,904,054 B1 | 6/2005 | Baum et al. | |
| 2002/0065907 A1 | 5/2002 | Cloonan et al. | |
| 2002/0078371 A1* | 6/2002 | Heilig et al. | 713/200 |
| 2002/0124191 A1* | 9/2002 | Molin | 713/202 |
| 2003/0195966 A1* | 10/2003 | Fujii | 709/228 |
| 2005/0060365 A1 | 3/2005 | Robinson et al. | |
| 2005/0068969 A1* | 3/2005 | Park et al. | 370/400 |
| 2005/0078824 A1* | 4/2005 | Malinen et al. | 380/247 |
| 2005/0152370 A1* | 7/2005 | Meehan et al. | 370/393 |
| 2006/0123469 A1 | 6/2006 | Lee et al. | |
| 2006/0259927 A1 | 11/2006 | Acharya et al. | |
| 2006/0274766 A1 | 12/2006 | Kwon | |
| 2007/0036336 A1 | 2/2007 | Wimmreuter | |
| 2007/0101351 A1 | 5/2007 | Bagsby et al. | |
| 2007/0115979 A1 | 5/2007 | Balay et al. | |
| 2007/0123253 A1 | 5/2007 | Simongini et al. | |
| 2007/0130465 A1* | 6/2007 | Zeng et al. | 713/171 |
| 2007/0203880 A1 | 8/2007 | Kumar et al. | |
| 2007/0206507 A1* | 9/2007 | Reichman et al. | 370/252 |

(Continued)

FOREIGN PATENT DOCUMENTS

JP    2003-348172    12/2003

OTHER PUBLICATIONS

"Enhanced Subscriber Management for Triple Play," http://www1.alcatel-lucent.com/doctypes/opgapplicationbrochure/pdf/PSCP_an.pdf, 2006.

(Continued)

*Primary Examiner* — Gilberto Barron, Jr.
*Assistant Examiner* — David Le
(74) *Attorney, Agent, or Firm* — Zilka-Kotab, PC (57) ABSTRACT

A system and method are described that use a subscriber-centric approach to scalably support the delivery of network services across numerous access protocols and across a multitude of access devices. By allowing the use of a service engine that can range in complexity from a simple macro to a rules engine, this approach is suitable for bundled services, as well as single services.

15 Claims, 6 Drawing Sheets

U.S. PATENT DOCUMENTS

2008/0056240 A1   3/2008   Ellis et al.
2008/0059653 A1   3/2008   Zabawskyi et al.

OTHER PUBLICATIONS

"Multiple Services—One Network," http://www.advaoptical.com/images/pdf/AN-Multiple_services_one_network.pdf.

"Integrated Multiple Service Access Node," http://www.intracom-telecom.com/en/products/network_solutions/ngn_ntw/ibas.htm, 2008.

"StarHub Selects Incognito's IP Commander for Provisioning of Broadband Internet and Digital Voice Services," DIALOG, Dec. 3, 2003.

* cited by examiner

SYSTEMS AND METHODS FOR FLEXIBLE SERVICE DELIVERY NETWORK SERVICES

CROSS REFERENCE TO RELATED APPLICATIONS

The present application claims the benefit of U.S. Provisional Patent Application No. 61/041,294, entitled "Systems and Methods for Flexible Service Delivery of Network Services", filed on Apr. 1, 2008, which is hereby expressly incorporated by reference in its entirety.

BACKGROUND OF THE INVENTION

1. Field of the Invention

The present invention relates to a method and apparatus for delivery of network services, and more specifically to a flexible yet scalable means of dynamically providing a variety of network services to a large subscriber base.

2. Background Art

An increasingly large number of individuals use portable computing devices, such as laptop computers, personal data assistants (PDAs), smart phones and the like, to support mobile communications. The number of computing devices, and the number of networks that these devices connect to, has increased dramatically in recent years. Similarly, an increasing number of wireless Internet access services have been appearing in airports, cafes and book stores.

As telecommunications technology continues to evolve to meet this ever increasing demand, service providers continue to make investments in state-of-the-art technology in order to remain at the forefront of offerings in the marketplace. However, in order to maximize their return on investment, service providers are constantly challenged to more effectively market their technology offerings by offering richer choices to their subscriber base, and to deliver those choices in a timely and seamless fashion.

Traditionally, management of subscriber services has been focused at the connection point by the subscriber to the network. Accordingly, management profiles are created at each and every connection point, with individual profiles generated to support each subscriber, for each service option subscribed to by each subscriber (including combinations of service options), for each access protocol used, and for each access device used by each subscriber in making that network connection. In a typical subscriber situation with rights to a bundled set of network services, a large number of profiles is not uncommon. Complicating these logistical concerns further is that each addition of a new access protocol requires that the entire list of profiles be recreated in support of the new protocol.

As the number of access protocols and complexity of bundled service offerings for each subscriber continue to escalate in the marketplace, the traditional approach of recreation of entire lists of profiles is simply not scalable and therefore inadequate. This problem is particularly exacerbated in scenarios where subscribers can create their own customized bundles of network services.

One approach to dealing with this challenge has been proposed by Alcatel, in their Enhanced Subscriber Management (ESM) product. Such an approach addresses the problem at the network device level, by providing an ability to extract the required network device information from the various access protocols. However, such an approach, while protocol independent, is not vendor independent.

What is needed is an approach whereby the creation and maintenance of the service profiles is independent of both access device and access protocol. Such an approach would greatly simplify the service configuration logistics and allow each service to be managed as a single logical entity, without the need to support additional profiles for each and every access protocol, and each and every access device. In the ideal approach, an access device or an access protocol could be changed for a given subscriber without the impediment of the effort to re-create or update all profiles that are impacted by such a change. Finally, it is desirable that the current practice of creating a multitude of profiles to support bundled services be replaced by a simplified approach that requires only the definition of the individual services, but not the additional profile definitions for all possible bundled combinations of those individual services.

BRIEF SUMMARY OF THE INVENTION

The present invention uses a service engine to dynamically determine a set of attributes required to deliver a service based on subscriber ID, access device and access protocol information. The present invention is expandable and can readily use information on other conditions to determine the correct configuration in support of the service requested by the subscriber.

In embodiments, the service engine can be as simple as a MACRO or as complex as a rules engine. In order to deliver the service to a subscriber, in real time, the service engine dynamically takes into account the subscriber's access device and access protocol to provide the correct set of attributes. The service engine can also be used to combine various services together into a service combination (or bundle) without the need for a service profile to be defined for the combination itself. The present invention avoids the proliferation of a large number of service profiles made possible by each possible service combination.

By using a subscriber-centric approach with the invention, services can be managed at a subscriber level, and are independent of both the access device and the access protocol. This substantially simplifies service configurations in that it allows a service to be managed as a single logical entity, rather than as a series of entities that depend on access technologies. Moreover, access technologies can therefore be changed without having to redefine the services available and assigned to the subscribers. Further, since service configuration is now separated from subscriber service management, the access device or access protocol can be changed for a given subscriber without having to modify the provisioned services for that subscriber.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Crucial to the delivery of network services is the ability to authenticate a subscriber and to authorize the service requested by that subscriber. To that end, each services provider creates and maintains a profile for each and every subscriber, such that the critical steps of authentication and authorization can be readily accomplished. Where more than one network access protocol is in use, the service provider is required to create and maintain a separate profile for each and every network access protocol in use.

At the time of the initial request for access to the network, the requester provides information (e.g., username and password) that can be used to authenticate the requester as a valid subscriber. Based on the particular access protocol that is used, the appropriate profile for that protocol-subscriber combination is located and the information provided by the requester is compared to that found in the relevant protocol-subscriber profile. In addition to authentication, this profile contains configuration attribute values that are used by the service provider to configure the network connection in accordance with the service level purchased by the subscriber. For example, data rate settings and other connectivity rules are configured based on the information contained in the particular protocol-subscriber profile.

Various access protocols exist that support the authentication and authorization process. The Remote Authentication Dial-In User Service (RADIUS) protocol is a widely adopted protocol for the authentication, authorization and accounting (AAA) steps used in controlling access to a network. Such a protocol is used across a diverse set of access technologies, including dial-in modems, cable, digital subscriber line (DSL), wireless and virtual private networks (VPNs). The DIAMETER protocol is another access protocol, and represents an upgrade in the AAA capabilities over those offered by the RADIUS protocol. Similarly, the dynamic host configuration protocol (DHCP) represents yet another access protocol, and is commonly used by subscribers to access an Internet Protocol (IP) network.

Figure 1:
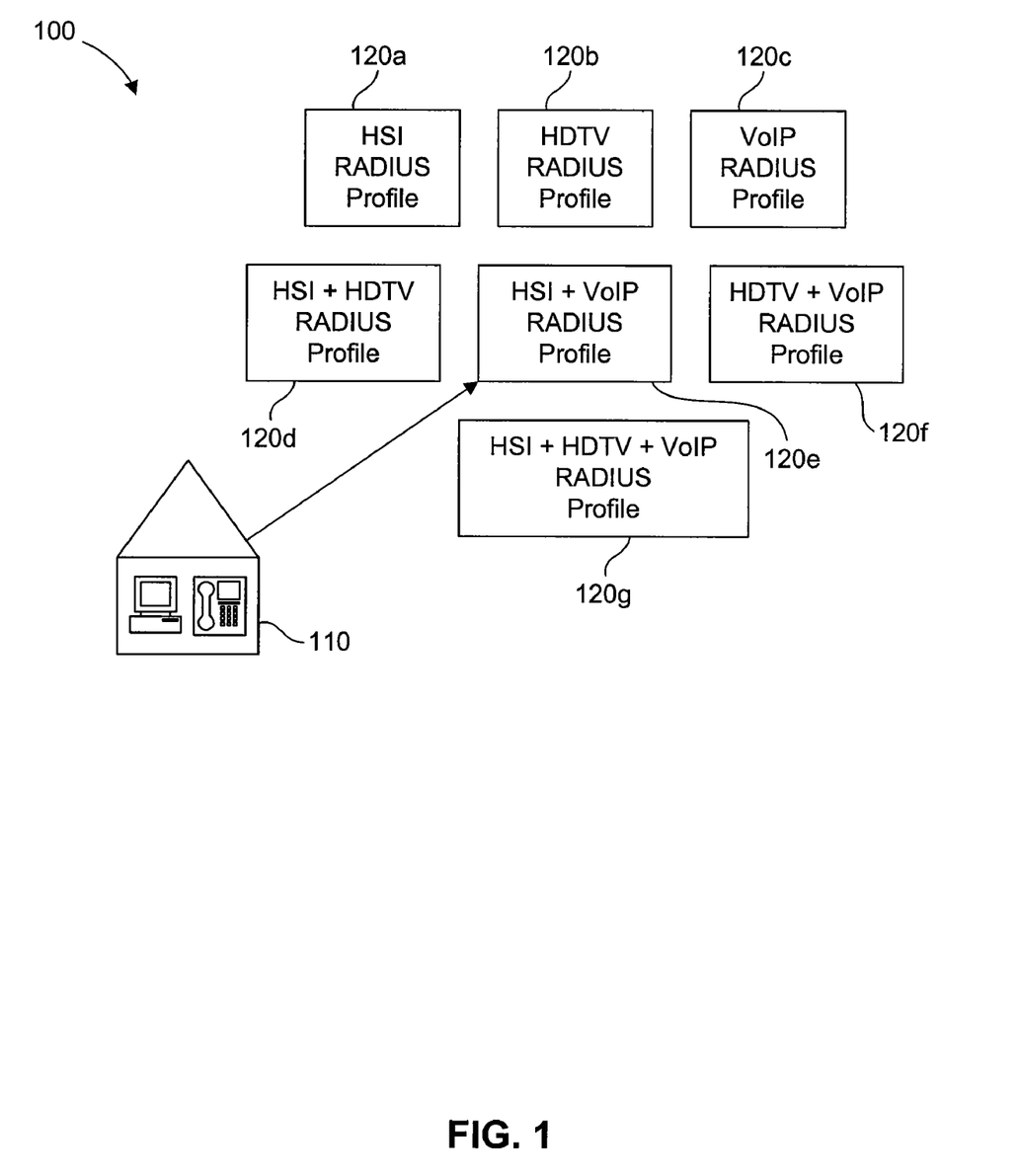
FIG. 1 provides a diagram showing a typical set of service profiles for a subscriber.

FIG. 1 provides a diagram showing an illustrative set of profiles for a subscriber 110, who has subscribed to a network provider for a particular bundle of services. As noted above, to facilitate the authentication and authorization of the subscriber when access is requested, the service provider creates and maintains one or more profiles that reflect the subscribed services. Consequently, in the case of a RADIUS access protocol, where subscriber 110 has subscribed to the bundled services of high speed Internet (HSI), high definition television (HDTV), and voice over Internet protocol (VoIP), a RADIUS profile is required for each and every individual service, together with the permissible combinations of those services. As such, the service provider creates and maintains the following RADIUS profiles, HSI 120a, HDTV 120b, VoIP 120c, HSI+HDTV 120d, HSI+VoIP 120e, HDTV+VoIP 120f, and HIS+HDTV+VoIP 120g. Given the proliferation of network services offered to a subscriber in the modern day marketplace, it follows that there is an exponential escalation in the number of profiles that require creation, maintenance and management by the service provider.

Figure 2:
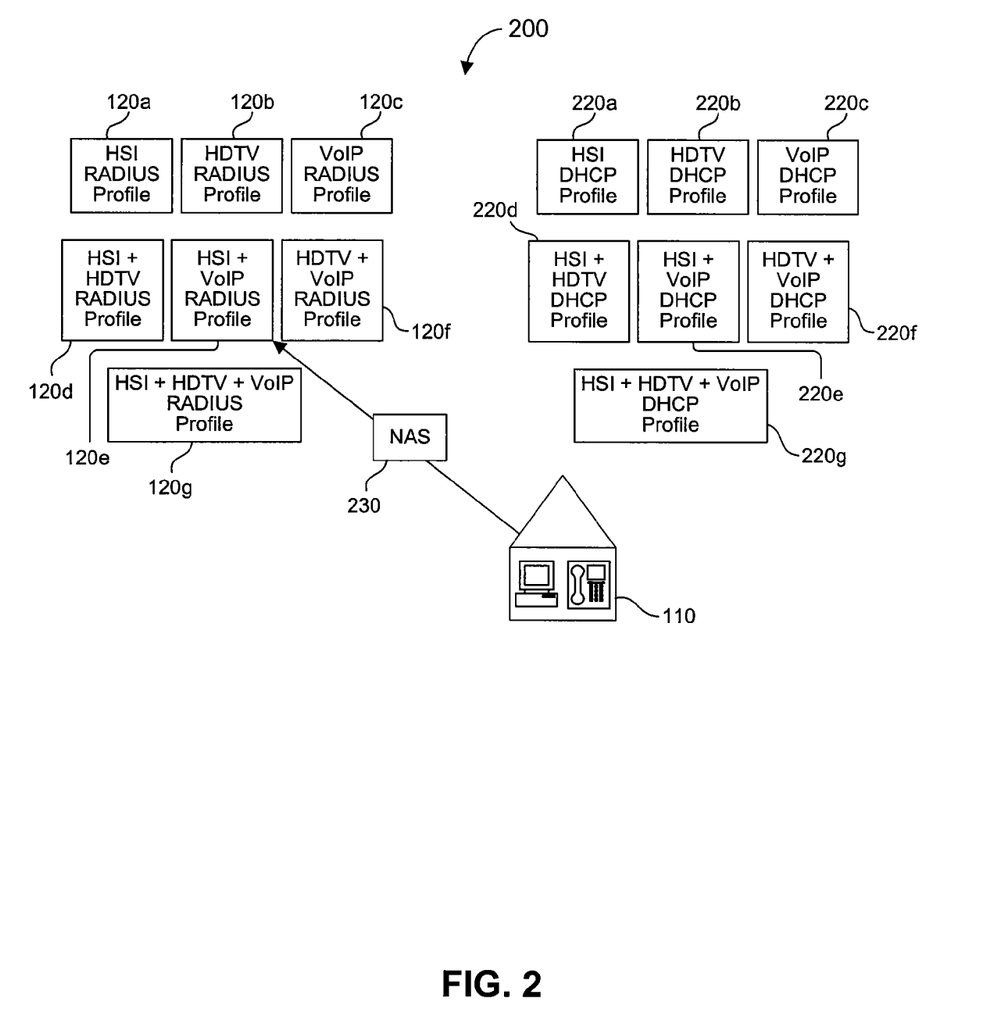
FIG. 2 provides a diagram showing the duplication of service profiles when a second access protocol is added.

In fact, the number of profiles that need to be created and maintained by a service provider is determined not only by the number of subscribed services, but is multiplied by the number of access protocols by which a subscriber may seek to gain access to the subscribed services. FIG. 2 illustrates the particular challenge posed by the multiplicity of access protocols in use in the marketplace. In FIG. 2, a subscriber 110 seeks access to the subscribed services via a network access server (NAS) 230. As before, where a RADIUS access protocol is used for the bundled HSI/HDTV/VoIP suite of services, a total of seven RADIUS profiles 120a-g needs to be established for that subscriber. However, should a new access protocol be warranted, seven additional profiles need to be defined in support of that new access protocol. Thus, as shown in FIG. 2, the addition of access via a dynamic host configuration protocol (DHCP) requires seven additional profiles 220a-g to be created and maintained for that particular subscriber 110 in support of the added DHCP access protocol. As expected, those seven profiles are the following DHCP profiles: HSI 220a, HDTV 220b, VoIP 220c, HSI+HDTV 220d, HSI+VoIP 220e, HDTV+VoIP 220f, and HSI+HDTV+VoIP 220g.

As noted earlier, the need to create and maintain an entire set of additional profiles for each and every new access protocol is unwieldy and unscalable. In contrast to the conventional wisdom, an embodiment of the approach described below refocuses the problem to that of creation and maintenance of profiles at the subscriber level, rather than at the level of access to the network. As such, subscriber profiles are defined using terms that are neutral with respect to access protocol, and are independent of the particular choice of access device. For example, in FIG. 3, a subscriber having subscribed to a gold level (i.e., top tier service level) of high speed Internet (HSI) service has those particular service characteristics populated in a subscriber-centric protocol-agnostic service definition 310. For example, a gold level HSI service level may be the provision of a T1 data rate available 24 hours every day of the year. Recognizing that the subscriber might access the network via either a RADIUS access protocol or a DHCP access protocol, separate profile mappings are automatically produced for the separate RADIUS 320a and DHCP 320b branches of the configuration tree.

Figure 3:
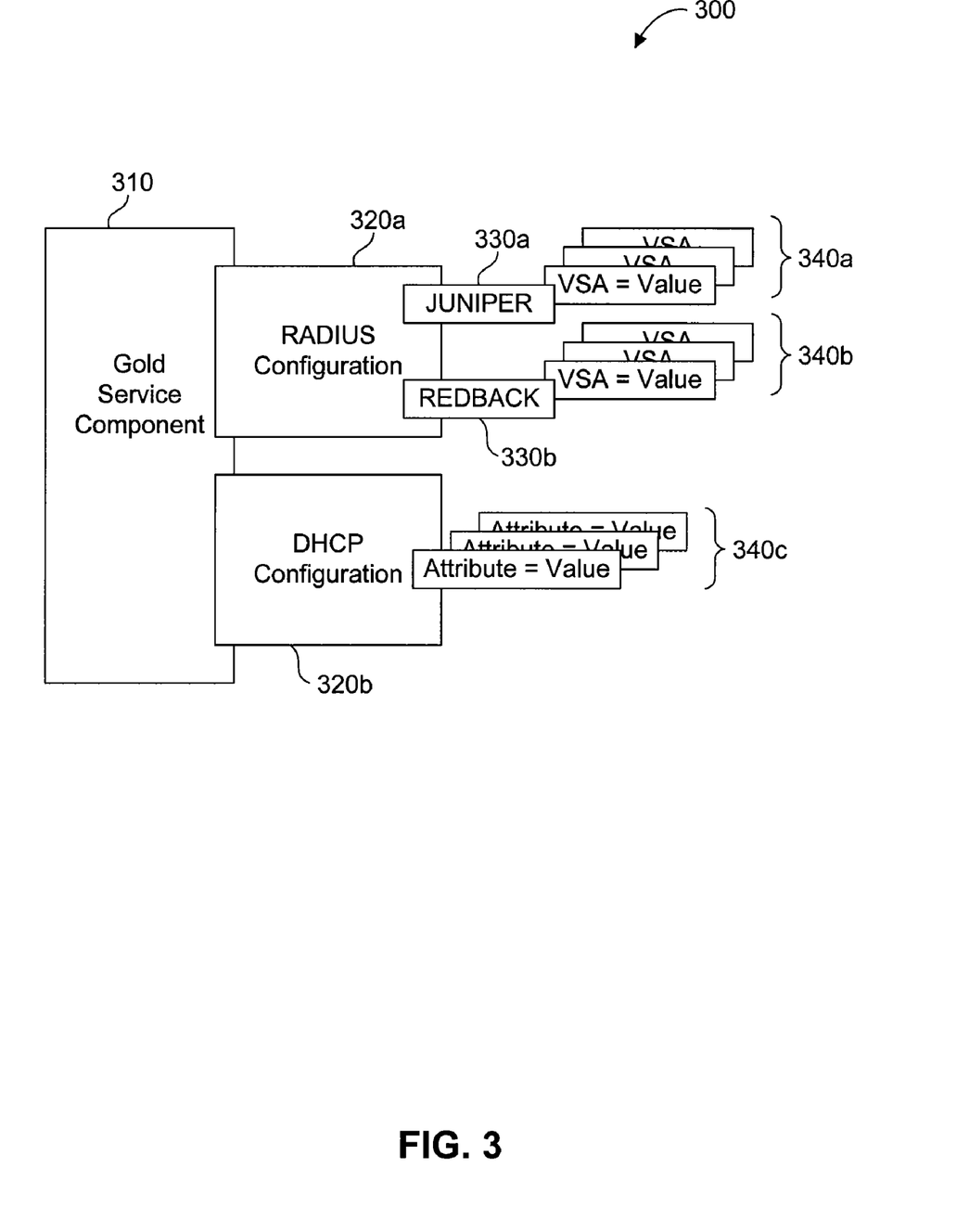
FIG. 3 provides a diagram illustrating the concept of being able to define a single subscriber centric service component, from which the individual service profiles for each access protocol can be determined, in accordance with an embodiment of the current invention.

The following example is illustrative of the approach of producing the protocol mappings within the service definition. For example, if a service provider wishes to offer a gold level HSI service level to its subscribers and the network contains a mixture of RADIUS-based broadband remote access servers (BRASs) and DHCP-based policy enforcement points (PEPs) for policy management, the following would be defined:

Gold Level HIS Server Level:
RADIUS (list of VSAs):
   VendorX-Peak-Download-Speed=5000000
   VendorX-Peak-Upload-Speed=2000000
DHCP (list of vendor specific data returned in a specified DHCP option):
   Option60=Download-Speed=5000000, Upload-Speed=2000000

As FIG. 3 further illustrates, RADIUS-based attribute support varies with network access server (NAS) vendors. For each RADIUS-based NAS vendor, a series of vendor specific attribute (VSA) pairs need to be generated that reflect the subscriber identity and service level captured in the gold service level 310. For example, in the case of a Juniper NAS, a Juniper RADIUS VSA profile 330*a* is generated. Alternatively, in the case of a Redback NAS, a Redback RADIUS VSA profile 330*b* is generated. In both cases, the sets 340*a* and 340*b* of VSA pairs represent mappings of the subscriber identity and service level captured in the gold service level 310—the mappings ensure that the relevant information is properly translated into the vernacular of each RADIUS-based NAS vendor. Similarly, in the case of a DHCP access protocol 320*b*, attribute-value pairs 340*c* are generated consistent with the gold service level 310.

Figure 4:
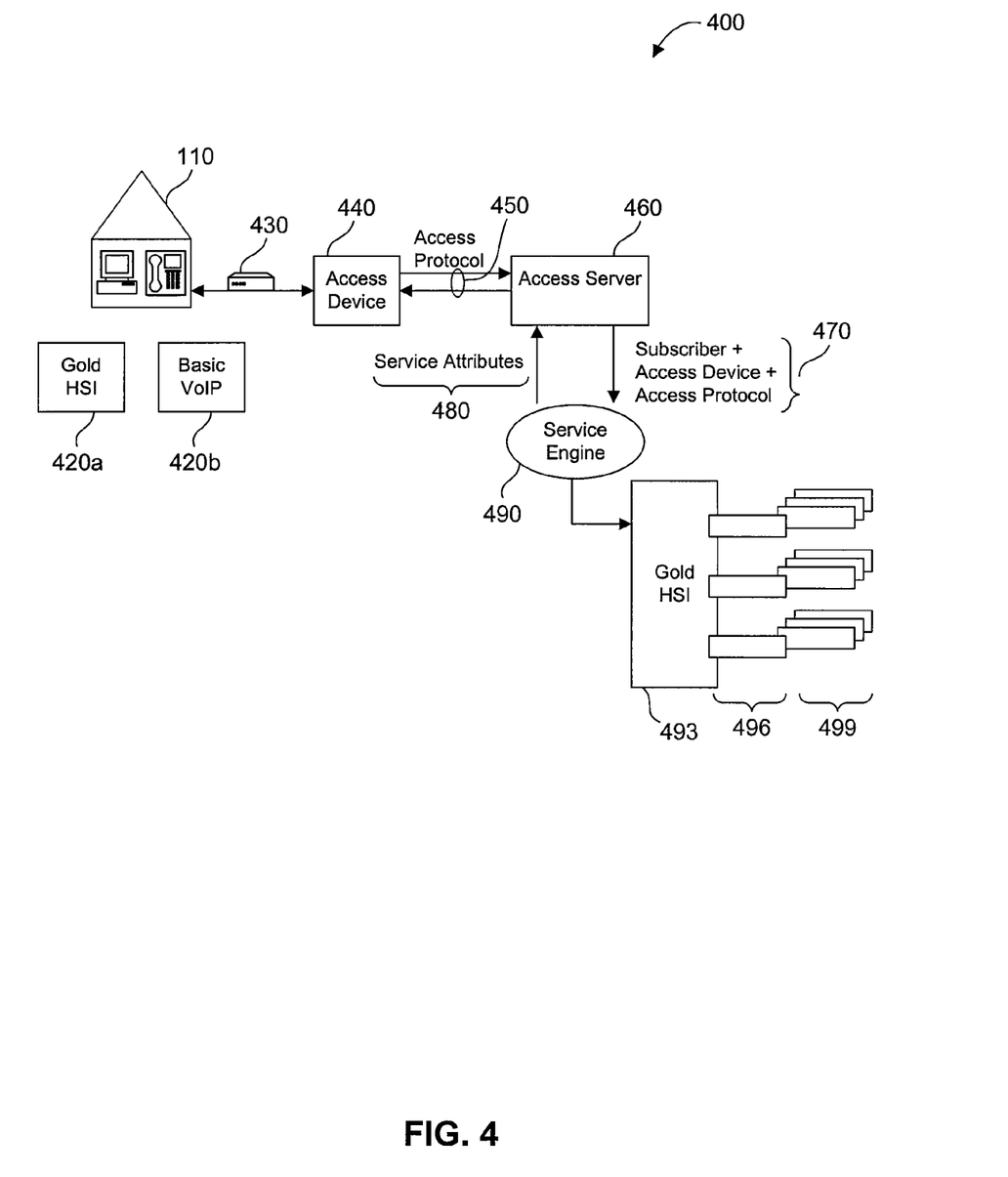
FIG. 4 is an overall diagram showing the connectivity of a subscriber with a complex service subscription package, requesting access, and a service engine responding to the subscriber request via an access device and access protocol, to provide the required service attributes (i.e., delivery) consistent with the access device and access protocol, in accordance with an embodiment of the current invention.

An embodiment of the current approach operates as shown in FIG. 4. A subscriber 110 subscribes to a bundled service combination consisting of a gold level HSI network access, together with a basic level VoIP capability. As a result, a gold HSI subscriber-centric profile 420*a* and a basic VoIP subscriber-profile profile 420*b* are created (and maintained) at the subscriber level. The subscriber initiates a network service request via a connection 430 using an access device 440. An example of a connection and access device include a DSL connection 430 to a DSL modem 440 at the telephone central office. Similarly, a cable connection 430 to a cable modem termination system 440 at the cable company's hub site. Other types of connections 430 include dial-up connections, wireless connections, fiber-optical connections, satellite, etc.

The access device 440 in turn requests authentication and authorization for the subscriber 110 using the relevant access protocol. Possible access protocols 450 supported by this approach include but are not limited to RADIUS, DHCP, and DIAMETER. Using the relevant access protocol, the network access server 460 is presented with an authentication/authorization request together with supporting information regarding the subscriber, the access device, and the access protocol involved. In order to process that request, the network access server 460 in turn forwards the request and supporting information 470 to the service engine 490.

Based on the request together with the supporting information 470, the service engine 490 consults the subscriber-centric profile 493 for the particular service requested by subscriber 110. Using the supporting information 470 (i.e., access device, access protocol), the service engine determines the mapping 496 associated with the particular access protocol (e.g., RADIUS), the NAS vendor (e.g., Juniper), and the access device (e.g., wireless) and thereby derives the relevant attributes 499 necessary to both respond to the authentication request and to authorize/configure the particular service requested by the subscriber. These resulting service attributes 480 (i.e., value-attribute pairs) are in turn fed to the access server 460 such that the authentication/authorization and configuration process is complete for the particular access protocol involved.

As may be readily surmised by an examination of FIG. 4, additional access protocols, access devices, and more sophisticated bundling of services may be readily added, without the scalability problems of having to manually add the additional profiles for each and every access protocol, and each and every access device.

One embodiment of implementation of this flexible approach is as follows. A NAS vendor specific dictionary is defined that identifies the access protocol informational attributes required by each NAS vendor such that the relevant access protocol can be properly administered. These vendor specific attributes are formatted such that the service engine can determine whether the requested attribute value is a static value, or whether a calculation using subscriber profile data need to be executed in order to determine the value of the particular attribute. As noted earlier, the calculation involved can be as straightforward as a macro function or as sophisticated as a rules engine computation. It is important to note the separation of service configuration (as reflected in the vendor-access-protocol specific dictionary) from subscriber service management (as reflected in the subscriber profile).

The following cases illustrate details of examples of the service engine. As noted earlier, the service engine is responsible for taking input parameters (e.g., subscriber ID, access device, device vendor, protocol) and determining the list of service attributes that are applicable for the subscriber. A simple example, one that could be implemented using a MACRO, is as follows.

A subscriber is provisioned in the system with "Gold Level HSI Service Level". The subscriber accesses the network through a VendorX BRAS which uses the RADIUS protocol for authentication and authorization. The service engine would be invoked with the following input parameters (subscriber@domain, BRAS, VendorX, RADIUS). The service engine would look up the purchased service for the subscriber (Gold Level HSI Service Level) and would retrieve the RADIUS service attributes configured for VendorX (ex: VendorX-Peak-Download-Speed=5000000, VendorX-Peak-Upload-Speed=2000000). These attributes are returned to the access device to setup the appropriate session for the subscriber.

A complex example, one that could use a rules engine, is as follows.

A subscriber is provisioned in the system with "Gold HS" & "VoIP" & "HDTV". The subscriber accesses the network through a VendorX BRAS which uses the RADIUS protocol for authentication & authorization. The service engine would be invoked with the following input parameters (subscriber@domain, BRAS, VendorX, RADIUS). The service engine would look up the purchased service for the subscriber (Gold HSI, VoIP, HDTV) and would retrieve the RADIUS service attributes configured for VendorX for each individual service, as the example below illustrates.

Gold HSI
      VendorX-Peak-Download-Speed = 5000000
      VendorX-Peak-Upload-Speed = 2000000
   VoIP
      VendorX-Peak-Download-Speed = 2000000
      VendorX-Committed-Download-Speed = 1500000
      VendorX-Peak-Upload-Speed = 2000000
      VendorX-Committed-Upload-Speed = 1500000
      VendorX-Lines = 2
   HDTV
      VendorX-Peak-Download-Speed = 5000000
      VendorX-Committed-Download-Speed = 4000000
      VendorX-Peak-Upload-Speed = 1000000
      VendorX-Committed-Upload-Speed = 1000000
      VendorX-Streams = 2

The service engine will need to combine the service attributes from each service into a combined list of service attributes to return for the subscriber. To do this in a customer configurable way, the service engine will invoke a rules engine providing the each service (Gold HSI, VoIP, HDTV) and their associated list of RADIUS service attributes. The rules engine would be configured with a list of rules to apply in order to combine the attributes, as the example below illustrates.

If attributeName exists "VendorX-Lines" action is multi-plication of VoIP "VendorX-Peak-Download-Speed", "VendorX-Peak-Upload-Speed", "VendorX-Committed-Upload-Speed", "VendorX-Committed-Download-Speed" by number of lines If attributeName exists "VendorX-Streams" action is multi-plication of HDTV "VendorX-Peak-Download-Speed", "VendorX-Peak-Upload-Speed", "VendorX-Committed-Upload-Speed", "VendorX-Committed-Download-Speed" by number of streams If attributeName equals "VendorX-Peak-Download-Speed" action is multiplication by 0.9 and addition If attributeName equals "VendorX-Peak-Upload-Speed" action is multiplication by 0.5 and addition If attributeName equals "VendorX-Committed-Download-Speed" action is addition If attributeName equals "VendorX-Committed-Upload-Speed" action is addition The rule engine evaluation would look like:

```
Processing of "VendorX-Lines"
   VendorX-Peak-Download-Speed = 2000000 x 2 = 4000000
   VendorX-Peak-Upload-Speed = 1500000 x 2 = 3000000
   VendorX-Committed-Download-Speed = 2000000 x 2 = 4000000
   VendorX-Committed-Upload-Speed = 150000 x 2 = 3000000
Processing of "VendorX-Streams"
   VendorX-Peak-Download-Speed = 5000000 x 2 = 10000000
   VendorX-Peak-Upload-Speed = 4000000 x 2 = 8000000
   VendorX-Committed-Download-Speed = 1000000 x 2 = 2000000
   VendorX-Committed-Upload-Speed = 100000 x 2 = 2000000
Processing of "VendorX-Peak-Download-Speed"
   VendorX-Peak-Download-Speed = 5000000 x 0.9 + 4000000 x 0.9 +
      10000000 x 0.9 = 4500000 + 3600000 + 9000000 = 17100000
   VendorX-Peak-Upload-Speed = 2000000 x 0.5 + 3000000 x 0.5 +
      8000000 x 0.5 = 1000000 + 1500000 + 4000000 = 6500000
   VendorX-Committed-Download-Speed = 4000000 +
   2000000 = 6000000
   VendorX-Committed-Upload-Speed = 3000000 + 2000000 = 5000000
```

The above list of resolved attributes is returned to the access device in order to setup a session for the subscriber. It should be noted that VendorX is an example in the above text. All of the attribute names and numbers are also provided purely for example purposes.

Figure 5:
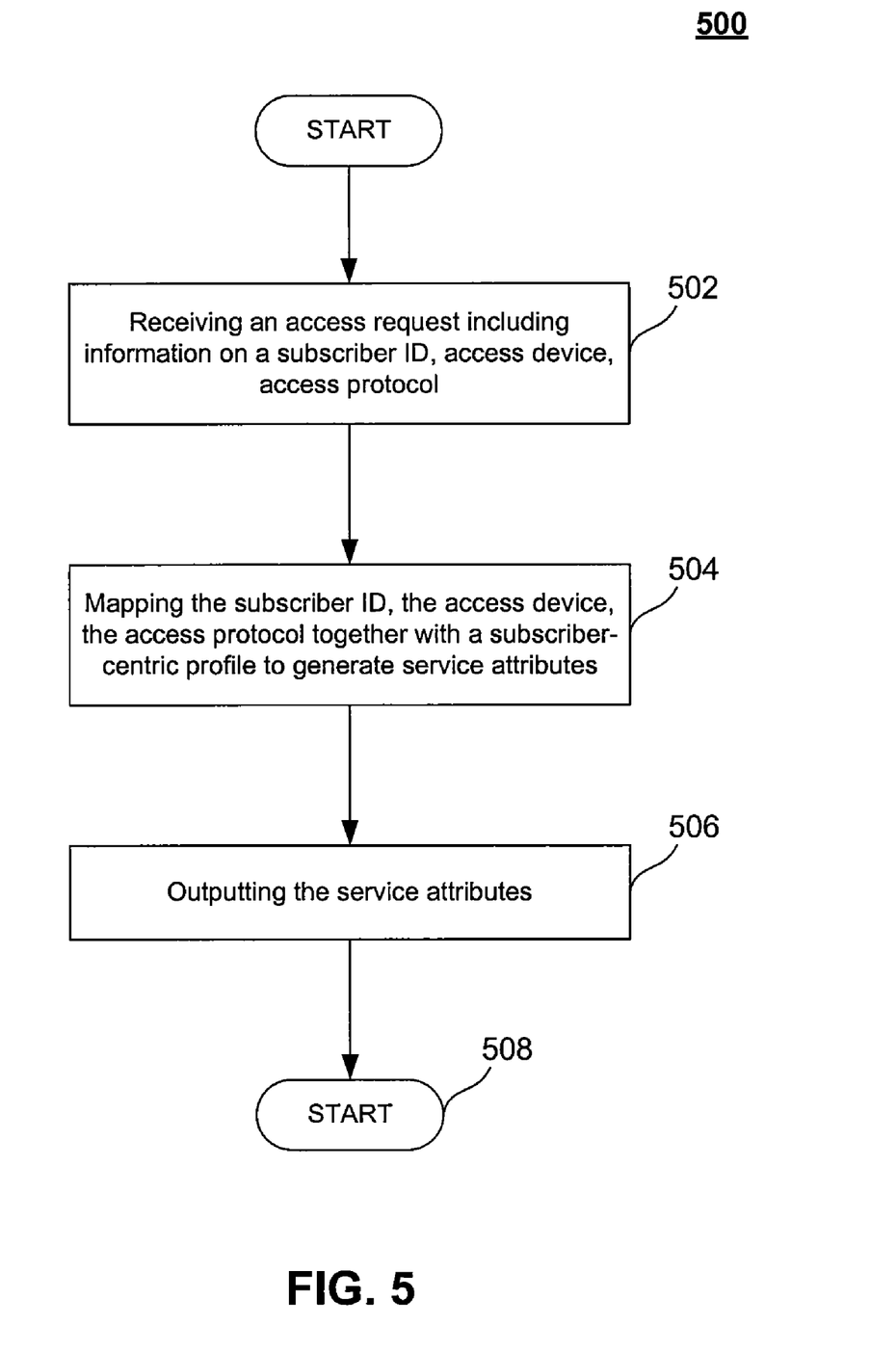
FIG. 5 provides an exemplary method for flexible service delivery of network services, in accordance with an embodiment of the current invention.

FIG. 5 provides an exemplary method 500 for a flexible service delivery of network services. Method 500 begins at step 502.

At step 502, the method provides for receiving an access request including information on a subscriber ID, an access device, and an access protocol.

At step 504, the method provides for mapping the subscriber ID, the access device, the access protocol together with a subscriber-centric profile to generate service attributes.

At step 506, the method provides for outputting the service attributes.

At step 508, the method ends.

By adopting the approach described above, a flexible yet scalable delivery of bundled network services can be provided to a subscriber base. Service definition is subscriber centric which therefore allows service to be managed as a single logical entity. By separating service configuration from subscriber service management, the access device or access protocol can be readily changed for a subscriber without incurring the substantial impediment of having to change the provisioned services. In addition, the service engine performs logic that combines multiple services for a given subscriber, which obviates the need to create and manage a large number of service profiles for every possible service combination in the subscriber base.

Computer System Implementation

Figure 6:
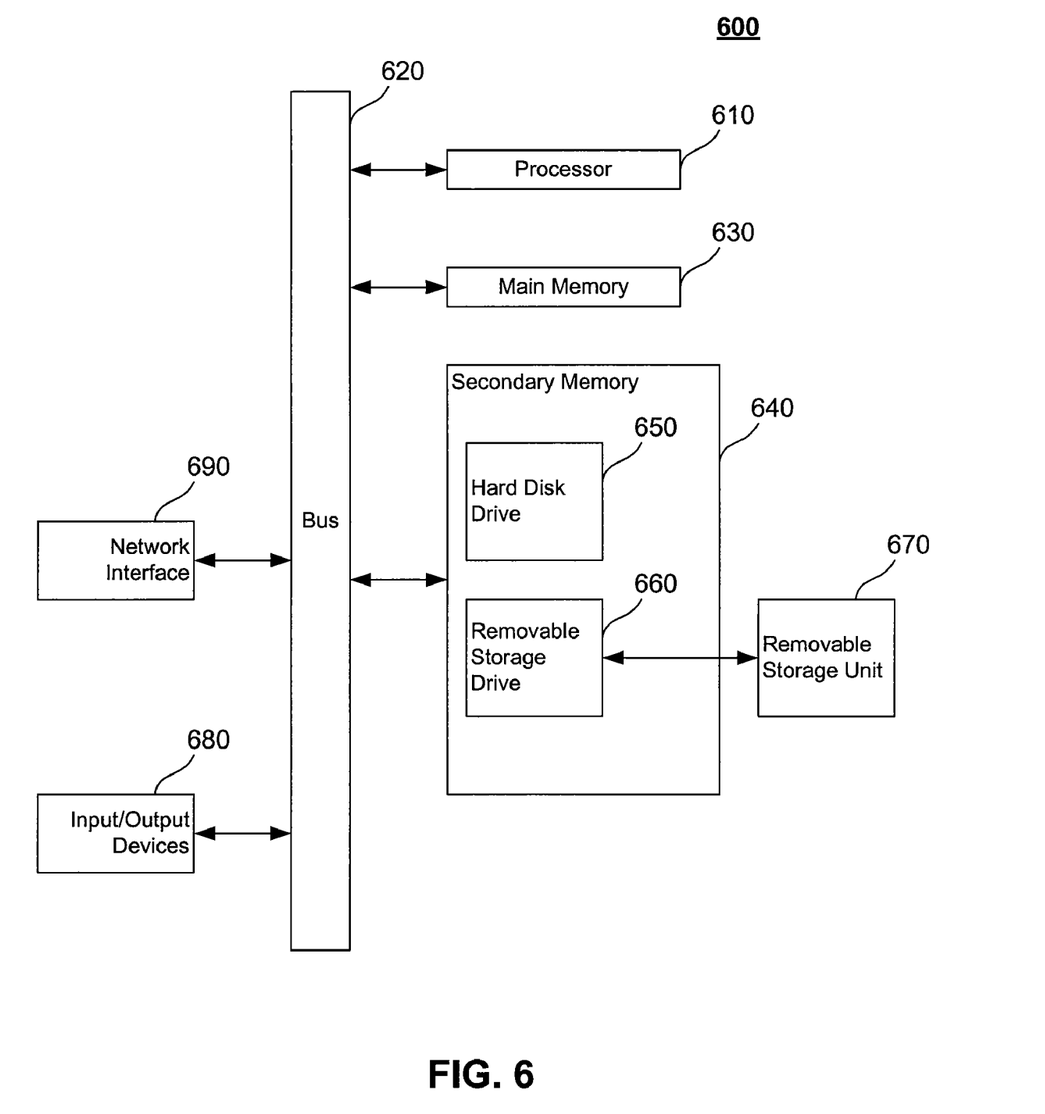
FIG. 6 is a diagram of a computer system on which the methods and systems herein described can be implemented, according to an embodiment of the invention.

In an embodiment of the present invention, the methods and systems of the present invention described herein are implemented using well known computers, such as a computer 600 shown in FIG. 6. The computer 600 can be any commercially available and well known computer capable of performing the functions described herein, such as computers available from International Business Machines, Apple, Sun, HP, Dell, Cray, etc.

Computer 600 includes one or more processors (also called central processing units, or CPUs), such as processor 610. Processor 610 is connected to communication bus 620. Computer 600 also includes a main or primary memory 630, preferably random access memory (RAM). Primary memory 630 has stored therein control logic (computer software), and data.

Computer 600 may also include one or more secondary storage devices 640. Secondary storage devices 640 include, for example, hard disk drive 650 and/or removable storage device or drive 660. Removable storage drive 660 represents a floppy disk drive, a magnetic tape drive, a compact disk drive, an optical storage device, tape backup, ZIP drive, JAZZ drive, etc.

Removable storage drive 660 interacts with removable storage unit 670. As will be appreciated, removable storage unit 660 includes a computer usable or readable storage medium having stored therein computer software (control logic) and/or data. Removable storage drive 660 reads from and/or writes to the removable storage unit 670 in a well known manner.

Removable storage unit 670, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 600, or multiple computer 600s to perform any combination of the functions described herein Computer programs (also called computer control logic) are stored in main memory 630 and/or the secondary storage devices 640. Such computer programs, when executed, direct computer 600 to perform the functions of the present invention as discussed herein. In particular, the computer programs, when executed, enable processor 610 to perform the functions of the present invention. Accordingly, such computer programs represent controllers of the computer 600.

Computer 600 also includes input/output/display devices 680, such as monitors, keyboards, pointing devices, etc.

Computer 600 further includes a communication or network interface 690. Network interface 690 enables computer 600 to communicate with remote devices. For example, network interface 690 allows computer 600 to communicate over communication networks, such as LANs, WANs, the Internet, etc. Network interface 690 may interface with remote sites or networks via wired or wireless connections. Computer 600 receives data and/or computer programs via network interface 690. The electrical/magnetic signals having contained therein data and/or computer programs received or transmitted by the computer 600 via interface 690 also represent computer program product(s).

The invention can work with software, hardware, and operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A hardware-based system, comprising:
a service engine having an input port and an output port, wherein the input port is adapted to receive an access request for a network service including information on a subscriber ID, an access device, and an access protocol, and wherein the output port is adapted to output service attributes, and wherein the service engine is adapted to map the subscriber ID, the access device, the access protocol, and a subscriber-centric profile to the service attributes, wherein the service attributes include parameters that provide configuration information for network devices to enable delivery of the network service in response to the received access request;
wherein the mapping further includes applying rules from a rules engine to map an access request that relates to bundled services, wherein applying the rules includes weighting service attribute parameters based on individual services within the bundled services.

2. The system of claim 1, wherein the access protocol is selected from the group consisting of remote authentication dial-in user service (RADIUS), DIAMETER, and dynamic host configuration protocol (DHCP).

3. The system of claim 1, wherein the access device is selected from the group consisting of a DSL-based, cable-based, wireless-based, and dial-in-based access device.

4. The system of claim 1, wherein the subscriber-centric profile includes quality of service metrics.

5. The system of claim 1, wherein the service attributes include one or more from the group consisting of attribute-value pairs and vendor specific attribute information.

6. A method, comprising:
receiving, by a computing device, an access request for a network service including information on a subscriber ID, an access device, and an access protocol;
mapping, by the computing device, the subscriber ID, the access device, the access protocol together with a subscriber-centric profile to generate service attributes, wherein the service attributes include parameters that provide configuration information for network devices to enable delivery of the network service in response to the received, access request; and
outputting, by the computing device, the service attributes;
wherein the mapping further includes applying rules from a rules engine to map an access request that relates to bundled services, wherein applying the rules includes weighting service attribute parameters based on individual services within the bundled services.

7. The method of claim 6, wherein the access protocol is selected from the group consisting of remote authentication dial-in user service (RADIUS), DIAMETER, and dynamic host configuration protocol (DHCP).

8. The method of claim 6, wherein the access device is selected from the group consisting of a DSL-based, cable-based, wireless-based, and dial-in-based access device.

9. The method of claim 6, wherein the subscriber-centric profile includes quality of service metrics.

10. The method of claim 6, wherein the service attributes include one or more from the group consisting of attribute-value pairs and vendor specific attribute information.

11. A non-transitory computer-readable medium containing instructions for controlling at least one processor by a method for delivery of network services, comprising:
receiving an access request for a network service including information on a subscriber ID, an access device, and an access protocol;
mapping the subscriber ID, the access device, the access protocol together with a subscriber-centric profile to generate service attributes, wherein the service attributes include parameters that provide configuration information for network devices to enable delivery of the network service in response to the received access request; and
outputting the service attributes;
wherein the mapping further includes applying rules from a rules engine to map an access request that relates to bundled services, wherein applying the rules includes weighting service attribute parameters based on individual services within the bundled services.

12. The non-transitory computer-readable medium of claim 11, wherein the access protocol is selected from the group consisting of remote authentication dial-in user service (RADIUS), DIAMETER, and dynamic host configuration protocol (DHCP).

13. The non-transitory computer-readable medium of claim 11, wherein the access device is selected from the group consisting of a DSL-based, cable-based, wireless-based, and dial-in-based access device.

14. The non-transitory computer-readable medium of claim 11, wherein the subscriber-centric profile includes quality of service metrics.

15. The non-transitory computer-readable medium of claim 11, wherein the service attributes include one or more from the group consisting of attribute-value pairs and vendor specific attribute information.

* * * * *